(12) United States Patent
Fishman et al.

(10) Patent No.: US 8,644,688 B2
(45) Date of Patent: Feb. 4, 2014

(54) COMMUNITY-BASED RECOMMENDATION ENGINE

(75) Inventors: Alex Fishman, San Francisco, CA (US); Crx K. Chai, Oakland, CA (US)

(73) Assignee: OpenTV, Inc., San Francisco, CA (US)

( * ) Notice: Subject to any disclaimer, the term of this patent is extended or adjusted under 35 U.S.C. 154(b) by 636 days.

(21) Appl. No.: 12/283,426

(22) Filed: Sep. 11, 2008

(65) Prior Publication Data

US 2010/0064325 A1    Mar. 11, 2010

Related U.S. Application Data (60) Provisional application No. 61/190,224, filed on Aug. 26, 2008.

(51) Int. Cl.
  *H04N 5/76* (2006.01)
  *H04N 21/433* (2011.01)

(52) U.S. Cl.
  CPC .............................. *H04N 21/4334* (2013.01)
  USPC ................. 386/299; 725/40; 725/51; 725/52; 386/296

(58) Field of Classification Search
  USPC ..................................... 725/61; 386/291–299
  See application file for complete search history.

(56) References Cited

U.S. PATENT DOCUMENTS

| | | | |
|---|---|---|---|
| 6,633,910 B1 | 10/2003 | Rajan et al. | |
| 7,312,785 B2 | 12/2007 | Tsuk et al. | |
| 2002/0144273 A1* | 10/2002 | Reto | 725/86 |
| 2003/0112467 A1 | 6/2003 | McCollum et al. | |
| 2004/0008972 A1* | 1/2004 | Haken | 386/83 |
| 2004/0268385 A1* | 12/2004 | Gray et al. | 725/34 |
| 2005/0149987 A1 | 7/2005 | Boccon-Gibod et al. | |
| 2006/0031510 A1* | 2/2006 | Beck et al. | 709/226 |
| 2007/0028270 A1 | 2/2007 | Ostojic et al. | |
| 2007/0050818 A1* | 3/2007 | Berger et al. | 725/58 |
| 2007/0204287 A1* | 8/2007 | Conradt et al. | 725/28 |
| 2008/0010372 A1 | 1/2008 | Khedouri et al. | |
| 2008/0092168 A1* | 4/2008 | Logan et al. | 725/44 |
| 2010/0138444 A1* | 6/2010 | Logue et al. | 707/769 |
| 2011/0265124 A1* | 10/2011 | Goldenberg et al. | 725/46 |

FOREIGN PATENT DOCUMENTS

| | | |
|---|---|---|
| WO | WO-2010025168 A1 | 3/2010 |
| WO | WO-2010025181 A1 | 3/2010 |

OTHER PUBLICATIONS

"International Application Serial No. PCT/US2009/055005, Search Report mailed Oct. 22, 2009", 4 pgs.
"International Application Serial No. PCT/US2009/055005, Written Opinion mailed Oct. 22, 2009", 5 pgs.
"International Application Serial No. PCT/US2009/055039, Search Report mailed Oct. 22, 2009", 4 pgs.
"International Application Serial No. PCT/US2009/055039, Written Opinion mailed Oct. 22, 2009", 5 pgs.

\* cited by examiner

*Primary Examiner* — Bennett Ingvoldstad
(74) *Attorney, Agent, or Firm* — Schwegman Lundberg & Woessner, P.A.

(57) ABSTRACT

A community-based recommendation engine is provided. In one example embodiment, a system to provide community-based recommendation engine comprises a recommendation detector and a decision module. The recommendation detector is configured to receive, at a viewer's system, a recommendation for a content item from a contact of a viewer. The decision module may be configured to determine an action to be performed at the viewer's system, based on the recommendation and on one or more rules, accept the recommendation as an instruction to perform the action, and initiate the action at the viewer's system.

29 Claims, 11 Drawing Sheets

COMMUNITY-BASED RECOMMENDATION ENGINE

RELATED APPLICATIONS

This patent application claims the benefit of priority, under 35 Section 119(e), to U.S. Provisional Patent Application Ser. No. 61/190,224, filed on Aug. 26, 2008, entitled COMMITMENT-BASED GUI, by inventors Alex Fishman and Crx K. Chai, which application is incorporated herein by reference in its entirety.

TECHNICAL FIELD

This application relates to the fields of media and entertainment and specifically to community-based recommendation engine.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In the field of media and entertainment, there is a new generation of viewers that has a high expectation of the level of entertainment to be enjoyed from various sources of content, such as, e.g., television programming, the Internet, and locally stored content. These viewers may expect more choice, more flexibility, as well as the ability to interact and participate more with the viewable content.

On the other hand, the sheer volume of content that is available for viewing is exploding dramatically. Just the number of television channels that are now available is almost unmanageable. The amount of content that is available via free video or video on demand service is also increasing. It is now possible to view content over a wider span of time by employing time shifting technologies, such as Personal Video Recording (PVR) (sometimes referred to as DVR or Digital Video Recording). This explosion of content may be described as a paradox of choice, where the excess of choices causes a viewer's inability to choose.

BRIEF DESCRIPTION OF DRAWINGS

Embodiments are illustrated by way of example and not limitation in the figures of the accompanying drawings, in which like references indicate similar elements and in which.

DETAILED DESCRIPTION

A next generation unified media interface is provided, designed to permit users to quickly and easily access content. The unified interface may be part of a community-focused media viewing environment that enables users to open up their virtual living room to others and thus expand their media universe. A unified media interface, also referred to a multi-panel media interface, is a menu structure that comprises a number of menu panels that are made accessible to a user as the user explores various menu options. A system to provide a community-focused media viewing environment may include a so-called community-based recommendation engine that may reside at a viewer's system, e.g., at a device in communication with a television (e.g., a set top box) or at a device integrated into a television. A set-top box (STB) is a device that connects to a television and an external source of signal, turning the signal into content which can then be displayed on the television screen. A set-top box may be configured to receive content from sources such as, e.g., an Ethernet cable, a satellite dish, a coaxial cable, a telephone line (including digital subscriber line (DSL) connections), Broadband over Power Line, as well as very high frequency (VHF) or ultra high frequency (UHF) antenna. While example embodiments are being described with reference to a set top box, the method and system described herein may be implemented within other devices capable of communicating with a television display device and with remote systems connected to a network.

A community-based recommendation engine may be configured to generate recommendations with respect to viewable programs available to users (e.g., television programs or previously recorded and locally stored content), send the recommendations to other viewers (by sending recommendations to the other viewers' set top boxes), and to cause the recommendations to trigger an action to be performed at the other viewers' set top boxes in response to the recommendations. For example, a viewer may wish to send a recommendation to a friend with respect to a particular television show. When the friend's set top box receives the recommendation, the friend's set top box may take actions to schedule the recording of the recommended content. The recommendation engine provided at one set top box may thus influence the behavior of another set top box.

As is described in more detail below, a recommendation engine may be provided with a media interface configured to include some of the features of on-line social networking. For example, a user may establish and maintain a network of contacts—"buddies"—and be able, e.g., to access their profiles, receive their recommendation and assign a level of trust to be associated with a particular buddy. A trust level may be expressed by a value, e.g., a numerical value such as a value between 1 and 4, or a string such as "ALL," "SOME," or "NONE." Based on the established trust level of a buddy, a user may permit recommendations from that buddy to influence behavior of the user's set top box.

Figure 1:
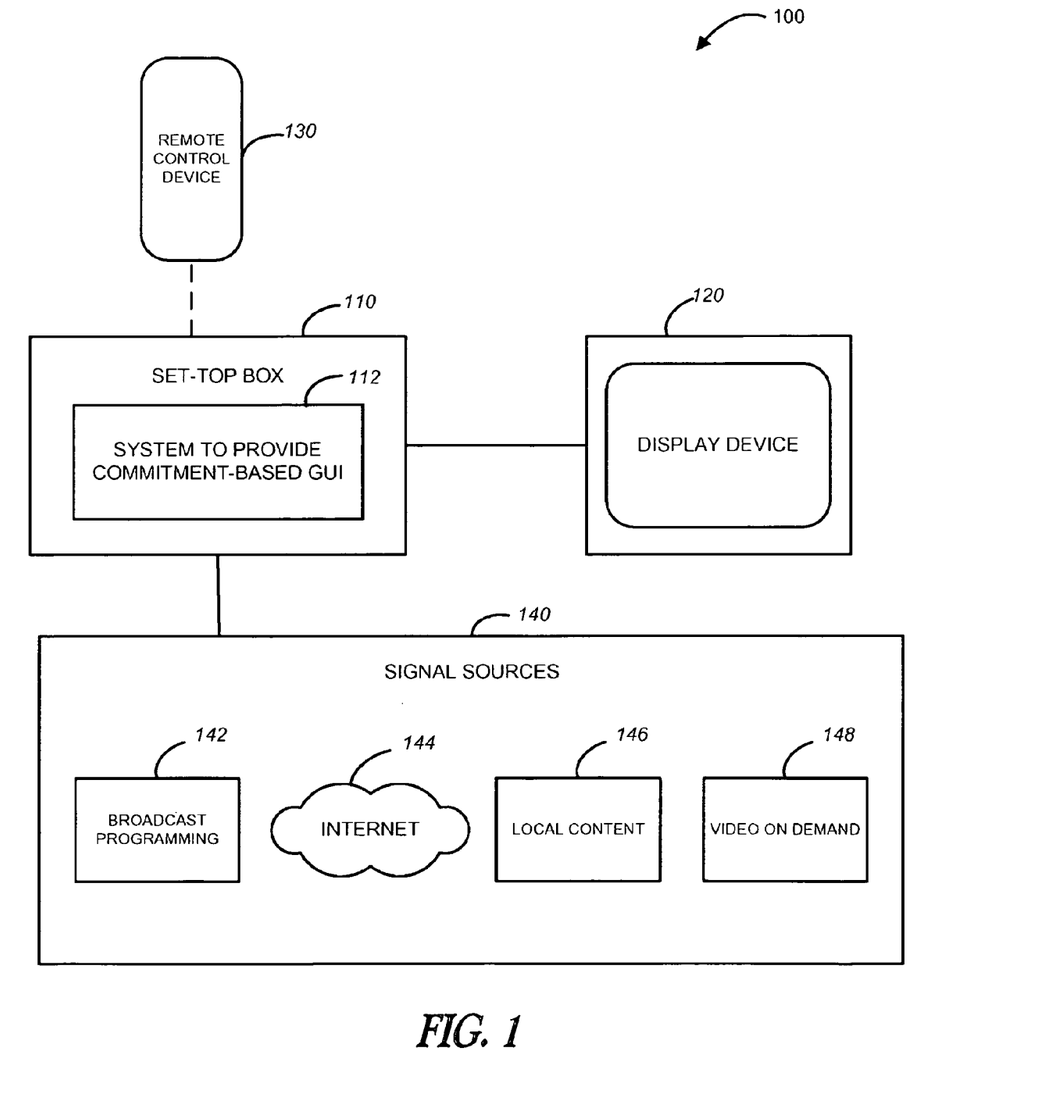
FIG. 1 illustrates an architecture that includes community-based recommendation engine, in accordance with an example embodiment.

Example architecture 100 that includes a community-based recommendation engine is shown in FIG. 1. The architecture 100 includes a set top box 110 configured to receive content and to be in communication with an entertainment display device 120 and a control device 130. The set-top box 110 may be configured to include a community-based recommendation engine 112 to permit sharing of recommendations among buddies with respect to viewable content. Content, in this context, could mean any or all of video, audio, Internet web pages, interactive games, or other possibilities. As shown in FIG. 1, the set-top box 110 has access to signal sources 140, including broadcast programming 142, video on demand programs 144, as well as to local content 146 and Internet content 148. A community-based recommendation engine may be utilized beneficially in the context of a network environment, where set top boxes may be configured to be in communication with a server, as well as with each other, as shown in FIG. 2.

Figure 2:
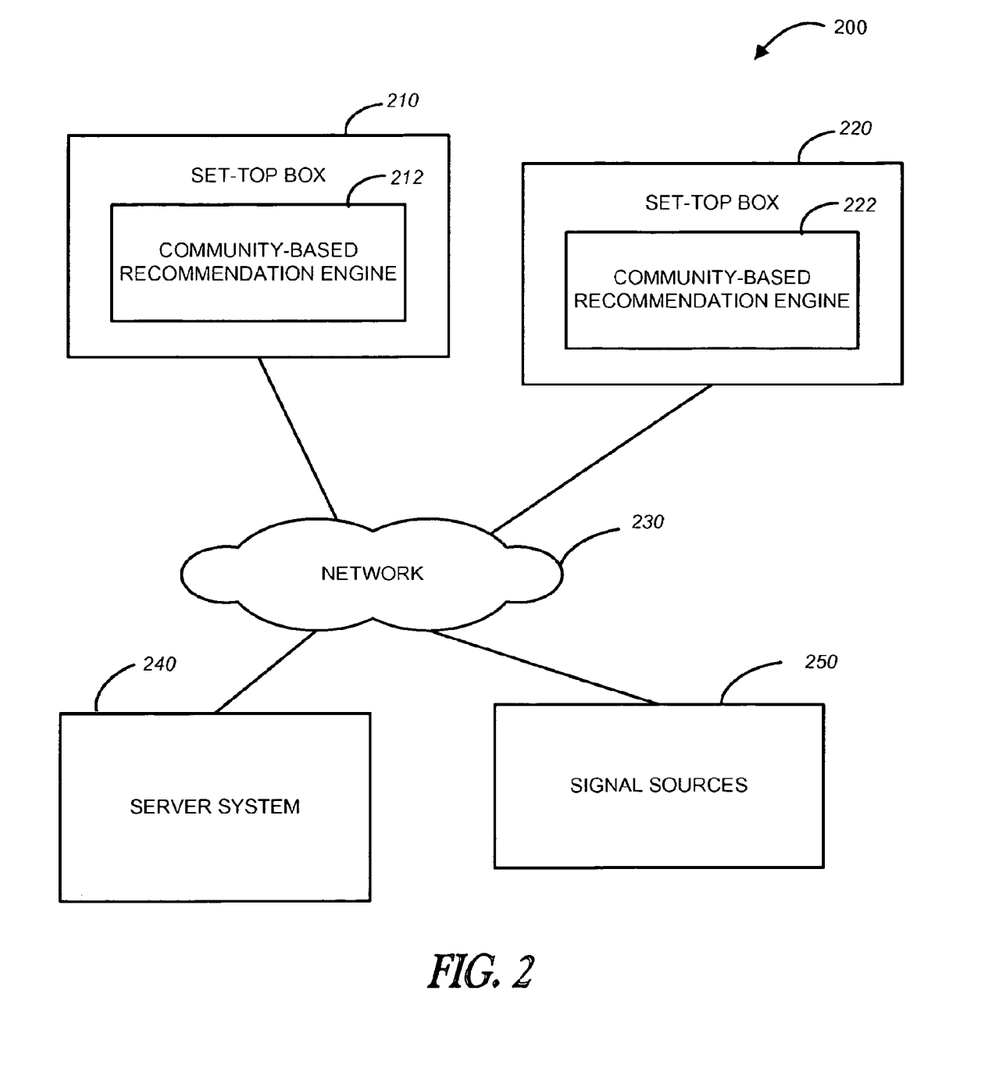
FIG. 2 illustrates an environment within which an example community-based recommendation engine may be implemented, in accordance with an example embodiment.

FIG. 2 illustrates a network environment 200 within which an example community-based recommendation engine may be implemented. The environment 100 includes a set top box 210 and a set top box 220 configured to receive content from content sources 250 and to be in communication with a server system 240 via a communications network 230. The communications network 230 may be a public network (e.g., the Internet, a wireless network, etc.) or a private network (e.g., a local area network (LAN), a wide area network (WAN), Intranet, etc.). The server 240 may be configured to collect rating information from users, to aggregate the rating information, and to provide the aggregated ratings to users. In some embodiments, the method and system described herein may be performed without the use of a server, in a peer-to-peer fashion. The server 240 may also be configured to process communications between the set top box 210 and the set top box 220. The set-top boxes 210 and 220 may be configured to include community-based recommendation engines 212 and 222 respectively to permit generating, receiving, processing, and sharing of recommendations. Recommendations of content may be received or accessed at a set top box in various manners.

Figure 8:
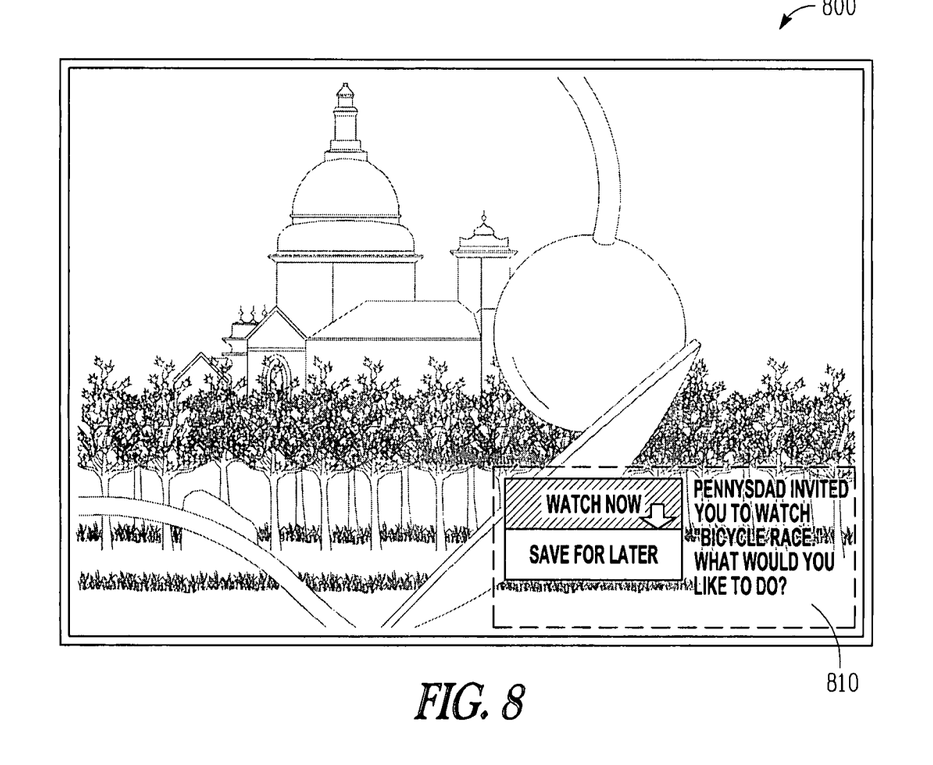
Figure 9:
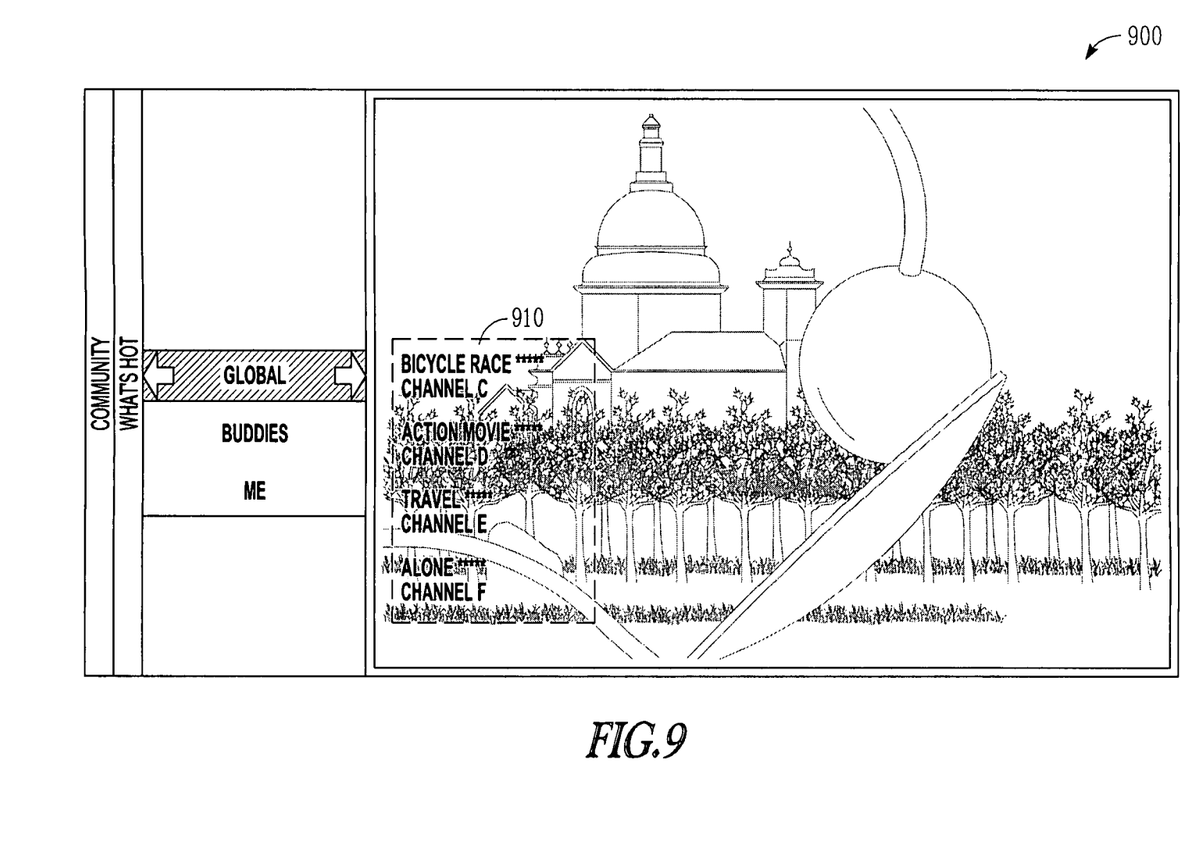
Figure 10:
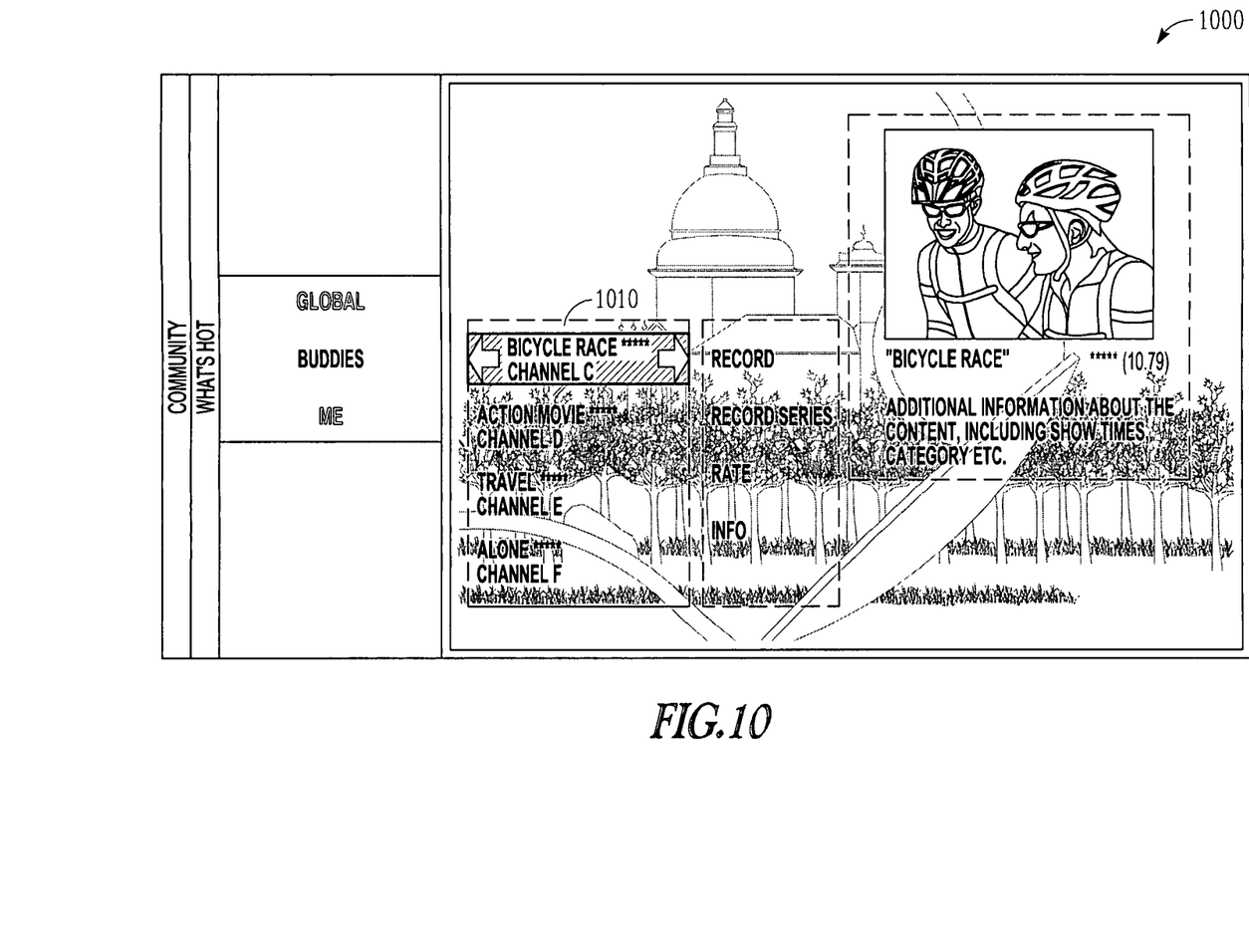

Example approaches of obtaining recommendations may include a so-called interactive method, a passive method, and an active method. When the interactive method is used, which may process "impulse" recommendations from users, a buddy of a user sends the user a recommendation for a viewable content. The content maybe a television show that the buddy is watching live or a show that will air in the future. In response to receiving the recommendation, the user may be presented with a pop-up message (e.g., as shown in FIG. 8 and described further below). A so-called passive method may be driven by the rating of the recommended content and the trust level granted to the sender of the recommendation. This recommendation method may be initiated when a user rates a piece of content, thus triggering a recommendation message to be sent to all of the people in their buddy list. Upon receipt of this recommendation message, the recommendation engine residing in the set top box of the recipient processes the recording behavior of the set top box based on the trust level of the sender buddy. This method is illustrated in FIG. 4 and described further below. A so-called active method is where the receiving of recommendations is initiated by the user when the user actively browses content designated by the community-based recommendation engine as the highest rated content. The designation of the highest rated content may be a result of ratings by the user's buddies, as well as the result of the aggregated rating collected from the global community. The active method may use a ratings aggregator that populates a "What's Hot" menu panel in the menu structure that displays the "Highest Rated" and the "Most Viewed" content (as shown in FIGS. 9 and 10 and described below). In one embodiment, one or more buddies of a user may be aggregated into groups. A rating of a content item by such group may be generated as a cumulative rating by all members of the group. A user can navigate the list of popular content and choose to watch or record items in the list. An example system to provide community-based recommendation engine may be described with reference to FIG. 3.

Figure 3:
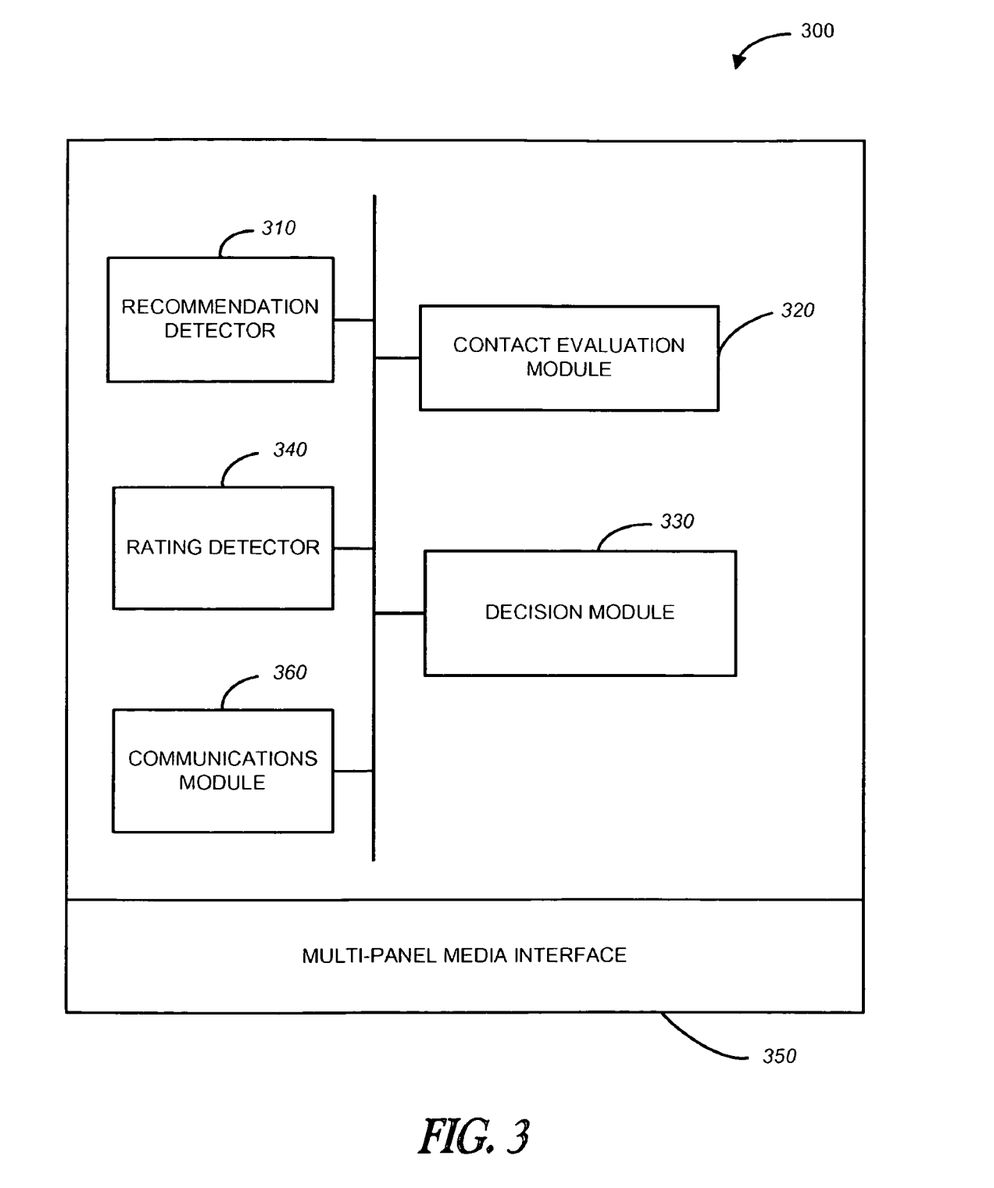
FIG. 3 is a block diagram illustrating a system to provide a community-based recommendation engine, in accordance with an example embodiment, to navigate viewable content.
Figure 4:
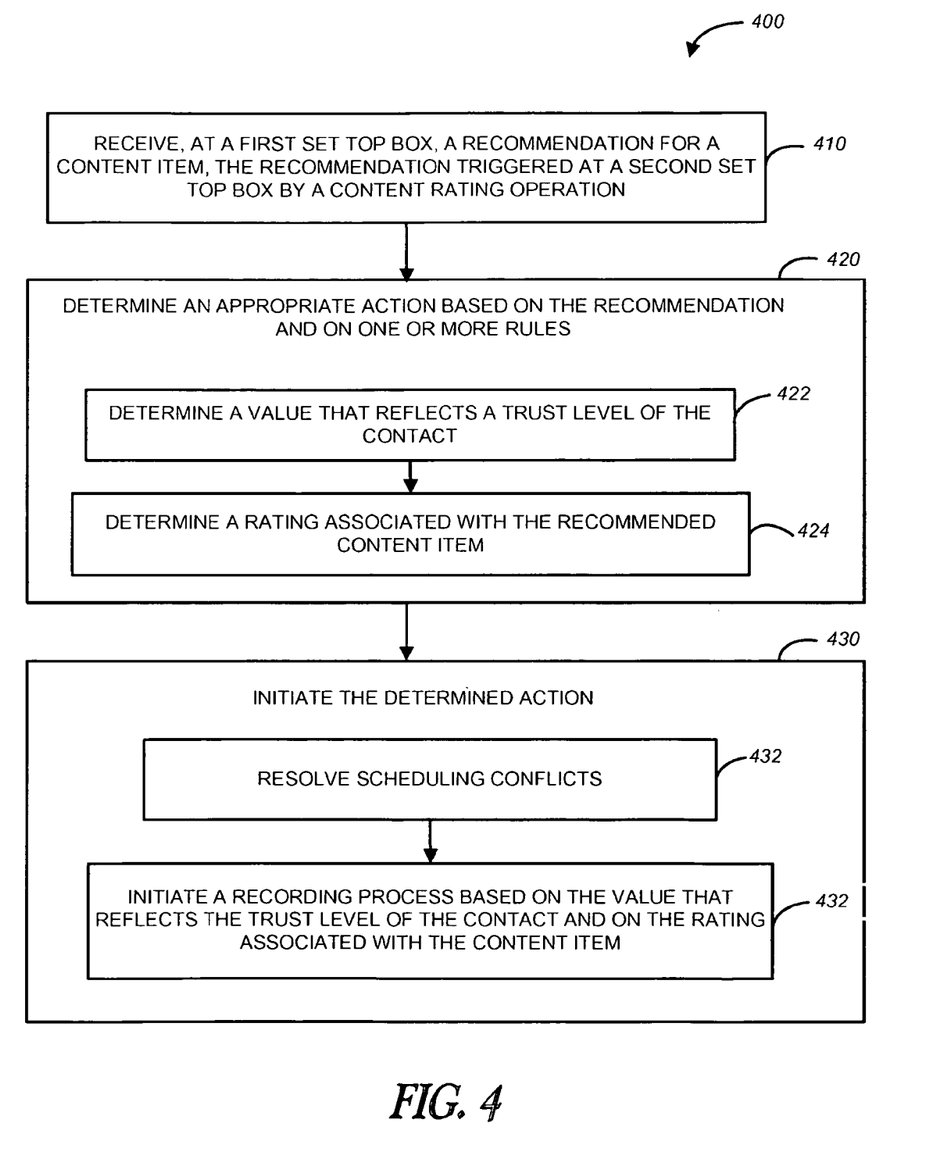
FIG. 4 is a flow chart illustrating a method for processing recommendations, in accordance with an example embodiment.

FIG. 3 illustrates an example community-based recommendation engine 300 that may be provided at a user's set top box. The community-based recommendation engine 300 includes a recommendation detector 310, a contact evaluation module 320, and a decision module 330. The recommendation detector 310 may be configured to detect a recommendation that originated from another set top box, e.g., a recommendation sent by a viewer who is a buddy of the user. In one example embodiment an operation of rating of a content item by a user triggers the sending of an associated recommendation from the user's set top box to all of the buddies of the user. The rating information may also be sent to the server 240 of FIG. 2 for aggregation. The aggregated ratings may then be accessed by user via a multi-panel media interface 350, as illustrated in FIGS. 9 and 10.

The decision module 330 may be configured to examine the detected recommendation and to determine an action to be performed at the user's set top box (or at some other component of the user's system), based on the information associated with the recommendation and based on one or more rules. As mentioned above, a user may define groups consisting of one or more buddies and define rules based on ratings by individual buddies, as well as by the collective rating by a group. Example rules are shown below.

If Buddy 1 gives 5 stars to content, record it

If Buddy 2 and Buddy 3 give the content 4 starts or above, record it

If any 4 of my Buddies give the content 4 stars or above, record it

If Group 1 gives the content 4 stars or above, record it

Returning to FIG. 3, the contact evaluation module 320 may be configured to evaluate the profile of the buddy who sent the recommendation. A profile may be maintained by the multi-panel media interface 350 that may be part of the recommendation engine 300 or a stand alone feature. A profile of a user may include various information about buddies, including a so-called "trust level" assigned by the user to that buddy. A trust level for a buddy may be set to a level between "NONE" and "ALL," the "NONE" level indicating the lowest level of trust and the "ALL" level indicating the highest. In one example embodiment, the decision detector 330 may be configured to determine whether the buddy's trust level that is included in the buddy's profile warrants the recording of the recommended content by the user's set top box.

In one example embodiment, the trust level of a buddy may be evaluated in conjunction with the star rating of the recommended content in order to determine whether to record the recommended content or take some other action, e.g., display a popup notification, sound an alarm (chime), set up a reminder, etc. For example, the content that has the highest rating (e.g., five stars) may be recorded by the user's set top box in response to the recommendation from a buddy, even if the trust level of the buddy is not at the highest level. As shown in FIG. 3, the community-based recommendation engine 300 may include a rating detector 340 to determine the star rating of the recommended content.

The multi-panel media interface 350 may comprise hierarchically structured menu panels and may be activated, e.g., in response to a command received by the set top box 110 from the remote control device 130 of FIG. 1. When the multi-panel media interface 350 is activated, a user is presented with a main menu that appears at the left-hand margin of a display area on the display device 120 of FIG. 1. The multi-panel media interface 350 may be configured to permit a user of the set top box create buddy profiles, to rate content, to send associated recommendations to buddies utilizing the communications module 360, as well as to invite buddies to watch a particular broadcast program. Example operations performed by the community-based recommendation engine 300 may be described with reference to FIG. 4.

FIG. 4 illustrates an example method 400 of receiving and processing a recommendation from a buddy with respect to viewable content. The method 400 may be performed in the context of television entertainment. The method 400 may be performed by processing logic that may comprise hardware (e.g., dedicated logic, programmable logic, microcode, etc.), software (such as run on a general purpose computer system or a dedicated machine), or a combination of both. It will be noted, that, in one example embodiment, the processing logic may reside in any of the modules shown in FIG. 3.

As shown in FIG. 4, the method 400 commences with operation 410, where the recommendation detector 310 of FIG. 3 detects a recommendation received from a contact (e.g., from one of a user's buddies). The sending of the recommendation from a set top box associated with the buddy may be triggered by a content rating operation requested by the buddy and performed at the buddy's set top box. The recommendation may be associated with a particular broadcast program or with a previously recorded content item, e.g., a recommendation with respect to a certain movie that was rated by the sending buddy with five stars. As mentioned above, the community-based recommendation engine may be used to permit one set top box to influence behavior of another set top box by means of sending a recommendation that can be treated by the recipient set top box as an instruction to record recommended content. An associated multi-panel media interface may be configured to provide means by which users may control the extent to which their set top box is open to being influenced by other users' recommendations. In one embodiment, a multi-panel media interface may be configured to provide social networking functionality where users may create their profiles and share their profiles with other users. A collection of profiles of other users may be referred to as the user's network of contacts or buddies. As mentioned above, each buddy may be assigned a certain level of trust that may determined whether a recommendation from that buddy should trigger a recording process.

At operation 420, the decision module 330 determined an appropriate action to be performed at the viewer's system, based on the recommendation and on one or more rules available to the viewer's system. A rule, in one example embodiment may dictate that a recommendation from a buddy that has been assigned by the viewer the highest trust level value, is to trigger a recording process for the recommended content. For example, as shown in FIG. 4, at operation 422, the contact evaluation module 320 of FIG. 3 accesses the profile of the buddy who sent the recommendation and determines the trust level for the sender. As will be further discussed with reference to FIG. 7, a trust level may indicate that all programs recommended by that buddy are to be scheduled for recording at the recipient's set top box. The decision module 330 of FIG. 3 may thus make a determination that the recommended content should be recorded once the contact evaluation module 320 detects that the buddy who sent the recommendation has the highest possible trust level. In some embodiments, a lower trust level may indicate that only those recommended programs that have a four or a five star rating are to be scheduled for recording. At operation 424, the rating detector 330 of FIG. 3 determines the star rating of the recommended content.

Figure 5:
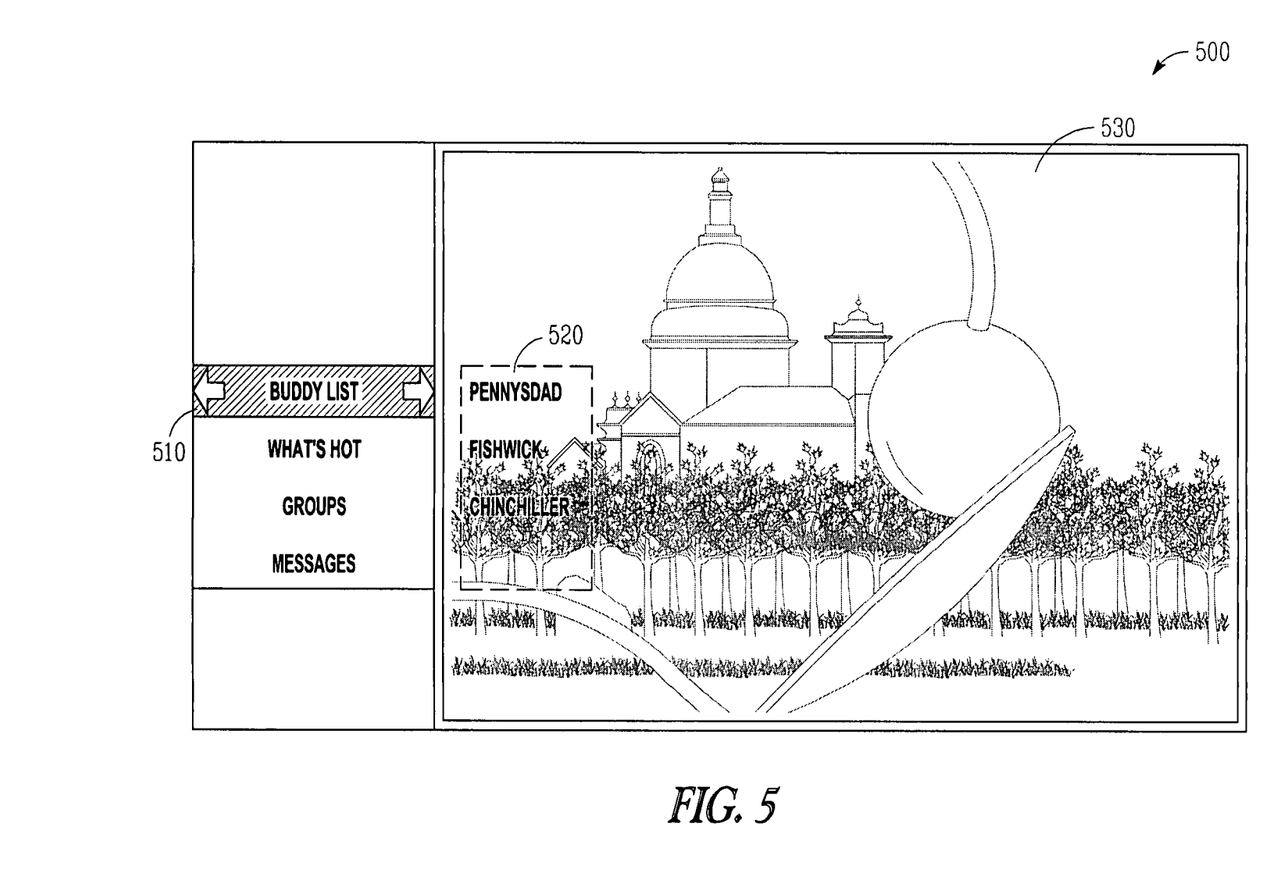
FIGS. 5-10 show presentations of a multi-panel media interface utilized provided with a community-based recommendation engine, in accordance with an example embodiment.

At operation 430, the decision module 330 initiates the determined action at the viewer's system. For example, where the action, based on determined trust level of the buddy and the rating of the recommended content, is a recording process, the decision module 330 may attempt to resolve any scheduling conflicts (operation 432) and, if successful, initiate the recording process at operation 434. 100281 As mentioned above, an example community-based recommendation engine may be utilized in conjunction with a multi-panel menu structure provided by the multi-panel media interface 350. Example visual presentations of various features of the community-based recommendation engine 300 accessible via the multi panel media interface 350 are provided in FIGS. 5-10. An example presentation interface showing a buddy list is illustrated in FIG. 5. As shown in FIG. 5, a presentation area 500 comprises area 510 to display a menu panel that has "BUDDY LIST" as one of the selectable options. A preview of the list of buddies that are on line and available is presented in area 520 in a semi-transparent manner. In one embodiment, the menu panels are presented in addition to the main content presented in area 530. The main content may be a television program, previously recorded content, an Internet web page, a locally stored digital photo, etc.

As mentioned above and as illustrated in FIG. 5, community focused media viewing environment allows people to connect and share their media experience. This includes sending and receiving recommendations with respect to television programs and previously recorded content, seeing what the user's buddies are watching the most, rating content, accessing recommended content, joining content driven groups, as well as messaging. In one example embodiment, as mentioned above, a user may navigate horizontally between menu panels by engaging the right and left directional arrow keys on a remote control device. A menu item may be associated with a specific menu panel that expands and retracts in line with the depth of the available menu options or based on additional information. The up and down arrow keys may be used to vertically scroll and navigate the content within the panel.

Figure 6:
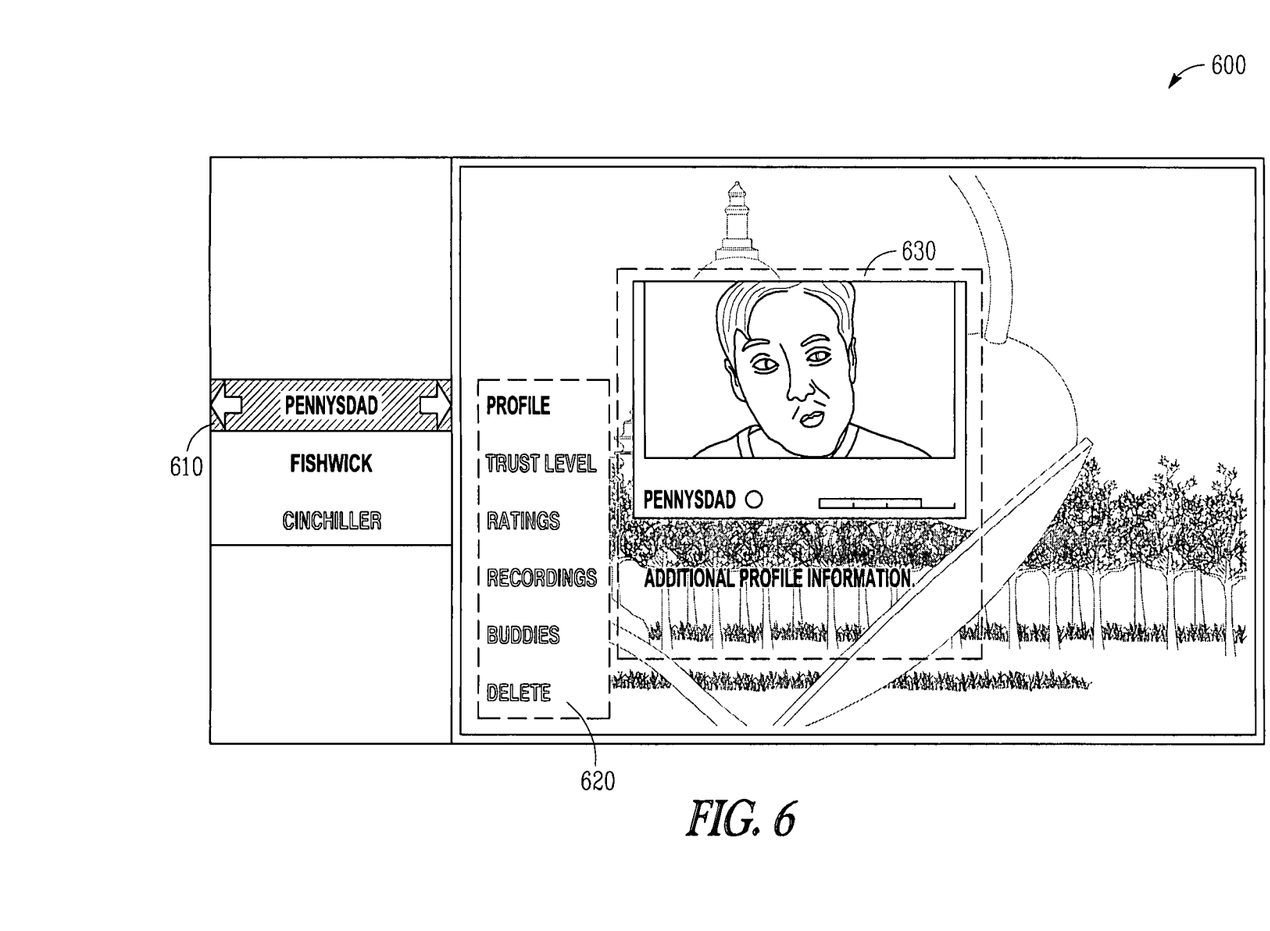

FIG. 6 illustrates a presentation interface provided in a presentation area 500 when a user selects a menu option associated with a particular buddy. In this example, the viewer has chosen to select the menu item provided in area 610 and titled "pennysdad" (e.g., by pressing the right arrow key on the remote control device). Once a specific buddy has been selected, the viewer can then select one of the action panel items displayed in the hover focus in area 620. Example choices presented in the action panel are listed below.

Profile—displays a buddy's specific profile
    Trust Level—controls permission settings
    Activity Stream—displays their recent activity
    Ratings—displays their specific ratings
    Recordings—displays their specific recordings
    Buddies—displays their buddies
    Delete—deletes them from your buddy list Each user can configure the amount of information they permit to be displayed to other users. Example profile information is shown in area 630. The example profile information for "pennysdad" may include a photo of "pennysdad," the favorite content items of "pennysdad," and a list of latest activity. Also shown in the area 630 is a trust level panel. Example trust panel is described below with reference to FIG. 7.

Figure 7:
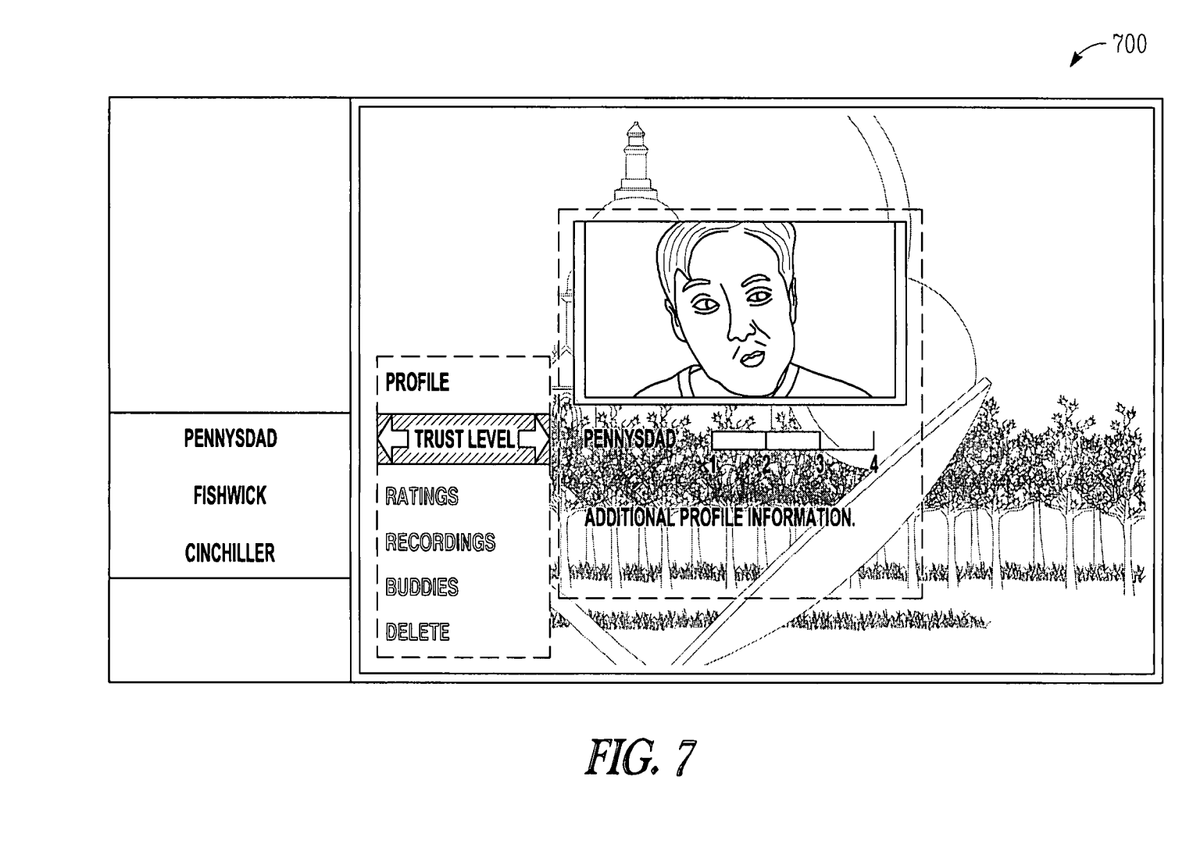

FIG. 7 illustrates a presentation interface provided in a presentation area 600 for managing permission settings for a buddy, including setting the trust level for the buddy. For example, if the trust level is extremely high for a particular buddy, the user may set the trust level to record "All PVR recommendations." Alternatively, if the trust level is very low, the user may set the permission level not to record anything from this buddy. Example trust levels are listed below.

ALL—trust level high, record all PVR recommendations
SOME—record everything 4 stars or more
LITTLE—record everything with 5 stars
NONE—do not record anything from this buddy.

Example trust levels are also shown in area 710. The trust panel shown in the area 710 has labels denoted by numbers 1, 2, 3, and 4. These numbers correspond to "NONE," "SOME," "LITTLE," and "ALL" trust levels respectively.

FIG. 8 illustrates an example recommendation notification. Shown in the presentation area 800 is the main content and an overlapping notification in area 810. As shown in area 810, the user is presented with options to watch the recommended content now or to save it for later viewing.

FIG. 9 illustrates an example presentation interface 900 to permit a user to access information regarding top-rated content. The content that received the highest aggregated star ratings are shown in area 910. FIG. 10 illustrates an example presentation interface 1000, including a selection by the user of a content item "Bicycle Race" in area 1010. When a particular top-rated content item is in focus, an action panel may be presented together with additional information about the selected content item.

Figure 11:
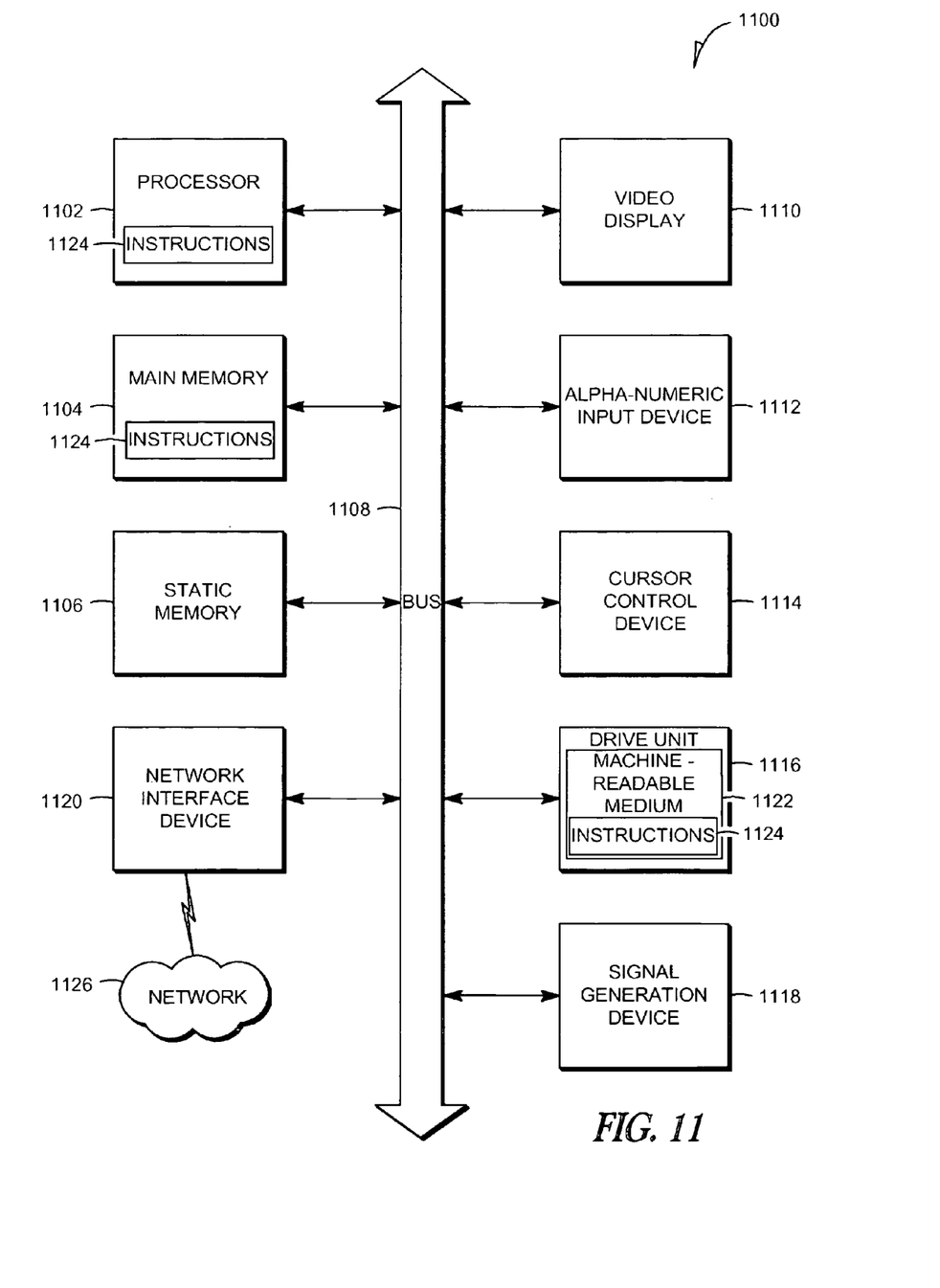
FIG. 11 illustrates a diagrammatic representation of a machine in the example form of a computer system within which a set of instructions, for causing the machine to perform any one or more of the methodologies discussed herein, may be executed.

FIG. 11 shows a diagrammatic representation of machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 11 10 (e.g., a liquid crystal display (LCD) or a cathode ray tube (CRT)). The computer system 1100 also includes an alphanumeric input device 1112 (e.g., a real or virtual keyboard), a viewer interface (UI) navigation device 1114 (e.g., a remote control or a mouse), a disk drive unit 1116, a signal generation device 1118 (e.g., a speaker) and a network interface device 1120.

The disk drive unit 1116 includes a machine-readable medium 1122 on which is stored one or more sets of instructions and data structures (e.g., software 1124) embodying or utilized by any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120 utilizing any one of a number of well-known transfer protocols (e.g., HTTP).

While the machine-readable medium 1122 (also referred to as a computer-readable medium) is shown in an example embodiment to be a single medium, the term "machine-readable medium" may be taken to include a single medium or multiple media (e.g., a centralized or distributed database, and/or associated caches and servers) that store the one or more sets of instructions. The term "machine-readable medium" shall also be taken to include any medium (e.g., FLASH memory media) that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

The embodiments described herein may be implemented in an operating environment comprising software installed on a computer, in hardware, or in a combination of software and hardware.

Thus, a system to generate and process recommendations with respect to content available for viewing (e.g., satellite content, cable content, mobile telephony content, IPTV content, and the like) and to manage a viewer's choice have been described. In the description above, for purposes of explanation, numerous specific details have been set forth in order to provide a thorough understanding of one example embodiment. It will be evident, however, to one skilled in the art that the present invention may be practiced without these specific details. It is to be noted that the delivery mechanism for the content for viewing may be via a satellite, cable, terrestrial broadcast, Internet, local storage, a local network, mobile telephony, or any other content distribution network. Accordingly, the viewing device need not be a television set but may be any display unit of any device (including portable devices). It will be noted that any references to television content will be understood to include any content available for viewing on an entertainment display device, such as a television screen. Such content may include television programming, as well as locally stored content, such as stored video files or digital images, as well as content accessible via the Internet. It will be noted that the term viewer may be understood broadly as any viewer of the system to navigate television content.

The invention claimed is:

1. A computer-implemented method comprising:
   maintaining profile data at a viewer device for each of a plurality of contacts of a viewer, the profile data including a trust level assigned to each contact of the plurality of contacts, the trust level being assigned by the viewer;
   establishing, by the viewer, a plurality of rules that each indicate an action to be performed based on a combination of a trust level and a content rating, at least one of the plurality of rules indicating a specific contact of the plurality of contacts for which the combination of the trust level and the content rating apply;
   receiving, at the viewer device, a recommendation for a content item, the recommendation including a contact identifier and a content rating;

accessing the profile data using the contact identifier to obtain a trust level for the contact associated with the contact identifier;

determining the action with respect to the recommendation for the content item to be performed at the viewer device based on the rule corresponding to the combination of the trust level and the content rating; and initiating the action at the viewer device, the action including selectively accepting the recommendation as an instruction to perform an action at the viewer device.

2. The method of claim 1, wherein the action to be performed at the viewer device comprises initiating a recording process on the viewer device for the content item if no recording scheduling conflicts exits.

3. The method of claim 2, wherein the content rating includes three or more content item ratings ranging from a low content item rating to a high content item rating, and the trust level includes a range of trust levels that include three or more trust levels ranging from a low trust level to a high trust level.

4. The method of claim 1, further comprising causing a media interface to be displayed to the viewer to allow the viewer to define a trust level for each of the plurality of contacts.

5. The method of claim 1, wherein the initiating of the action at the viewer device comprises causing the recommendation to be displayed to the viewer on a display screen associated with the viewer device.

6. The method of claim 5, wherein the display screen is a television screen.

7. The method of claim 6, further comprising:

receiving, at the viewer device, an instruction from the viewer to rate a content item displayed on the television screen;

receiving, at the viewer device, an instruction from the viewer to send a recommendation of the content item to another viewer device associated with the contact of the viewer; and sending the recommendation including a content item identifier identifying the content displayed, an identifier to identify the viewer, and the content item rating to the other viewer device.

8. The method of claim 7, wherein the instruction to rate the content item includes receiving a communication from a remote control device associated with the viewer device in response to the viewer engaging one or more keys on the remote control device.

9. A viewer device comprising:

a memory to store profile data for each of a plurality of contacts of a viewer, the profile data including a trust level assigned to each contact of the plurality of contacts, the trust level being assigned by the viewer;

at least one processor coupled to the memory;

a recommendation detector configured to receive, at the viewer device, using the at least one processor, a recommendation for a content item, the recommendation including a contact identifier and a content rating;

a contact evaluation module configured to access the profile data in the memory using the contact identifier to obtain a trust level for the contact;

a decision module configured to:

determine an action with respect to the recommendation for the content item to be performed at the viewer device based on a rule corresponding to a combination of the trust level and the content rating, the rule being included in a plurality of rules, established by the view, that each indicate an action to be performed based on the combination of the trust level and the content rating, at least one of the plurality of rules indicating a specific contact of the plurality of contacts for which the combination of the trust level and the content rating apply, and initiate the action at the viewer device, the action including selectively accepting the recommendation as an instruction to perform an action at the viewer device.

10. The viewer device of claim 9, wherein the action performed at the viewer device comprises initiating a recording process on the viewer device for the content item and wherein the content item is recorded if no recording scheduling conflicts exits.

11. The viewer device of claim 10, wherein the content rating includes a range of trust levels that include three or more content item ratings ranging from a low content item rating to a high content item rating, and the trust level includes three or more trust levels ranging from a low trust level to a high trust level.

12. The viewer device of claim 9, wherein the recommendation is received from a set top box of the contact via the Internet.

13. The viewer device of claim 9, comprising a communications module to send a recommendation of a content item to a set top box associated with the contact of the viewer in response to an instruction from the viewer to rate the content item.

14. The viewer device of claim 9, comprising:

a display module to cause a media interface is to be displayed to the viewer to allow the viewer to define a trust level for each of the plurality of contacts; and a communication module configured to receive an instruction from the viewer to rate a content item; and send a recommendation including a content item identifier identifying the content item displayed and the content item rating to another viewer device.

15. The viewer device of claim 14, wherein the instruction to rate the content item is in response to the viewer engaging one or more keys on a remote control device.

16. The viewer device of claim 9, comprising a communications module to send the recommendation including a content item identifier identifying the content item displayed, an identifier to identify the viewer, and the content item rating to the other viewer device.

17. The viewer device of claim 9, wherein the decision module is configured to cause a real time notification of the received recommendation to be displayed on a display screen associated with the viewer device.

18. The viewer device of claim 17, wherein the display screen is a television screen.

19. A machine-readable non-transitory storage medium having instruction data to cause a machine to perform operations comprising:

maintaining profile data at a viewer device for each of a plurality of contacts of a viewer, the profile data including a trust level assigned to each contact of the plurality of contacts, the trust level being assigned by the viewer;

establishing, by the viewer, a plurality of rules that each indicate an action to be performed based on a combination of a trust level and a content rating, at least one of the plurality of rules indicating a specific contact of the plurality of contacts for which the combination of the trust level and the content rating apply;

receiving, at the viewer device, a recommendation for a content item, the recommendation including a contact identifier and a content rating;

accessing the profile data using the contact identifier to obtain a trust level for the contact associated with the contact identifier;

determining the action with respect to the recommendation for the content item to be performed at the viewer device based on the rule corresponding to the combination of the trust level and the content rating; and initiating the action at the viewer device, the action including selectively accepting the recommendation as an instruction to perform an action at the viewer device.

20. The method of claim 1, wherein the content rating is determined by the contact.

21. The method of claim 1, wherein the content rating is an aggregated rating determined at least from the plurality of contacts.

22. The method of claim 1, further comprising:
causing a contact name to be displayed in a display zone of a graphical user interface;
displaying at least three trust levels adjacent to the display zone;
monitoring user selection of a trust level;
assigning the selected trust level to the contact.

23. The method of claim 1, further comprising causing a pop-up menu to be displayed on a television screen when the recommendation is associated with a content item that is being broadcast when the recommendation is received by the viewer device.

24. The method of claim 1, wherein the recommendation is received via the Internet and the content item includes an Internet web page.

25. The method of claim 1, wherein the content rating is based on a rating by a contact and a community-based rating.

26. The method of claim 25, wherein the user device is a set-top-box and the recommendation is treated as an instruction to record the content item based on the community-based rating.

27. The method of claim 1, wherein the viewer can share their profile with other contacts in a social network.

28. The method of claim 1, further comprising:
storing personal information of the plurality of contacts; and
allowing the viewer to navigate through the plurality of contacts to view the personal information, the personal information being determined by a permission level set by the contact.

29. The method of claim 1, wherein the plurality of contacts are arranged in groups and a recording action is performed based on an aggregation of content item ratings from contacts in an associated group.

* * * * *

UNITED STATES PATENT AND TRADEMARK OFFICE
CERTIFICATE OF CORRECTION

PATENT NO. : 8,644,688 B2  
APPLICATION NO. : 12/283426  
DATED : February 4, 2014  
INVENTOR(S) : Fishman et al.

Page 1 of 1

It is certified that error appears in the above-identified patent and that said Letters Patent is hereby corrected as shown below:

In the Claims

In column 9, line 8, in Claim 1, delete "device ," and insert --device,--, therefor In column 9, line 32, in Claim 7, delete "device ," and insert --device,--, therefor In column 9, line 35, in Claim 7, delete "device ," and insert --device,--, therefor In column 9, line 60, in Claim 9, after "contact;", insert --and--, therefor In column 10, line 6, in Claim 9, delete "device ," and insert --device,--, therefor In column 10, line 33, in Claim 14, delete "to" and insert --to:--, therefor In column 10, line 35, in Claim 14, delete "item ;" and insert --item;--, therefor In column 11, line 24, in Claim 22, after "level;", insert --and--, therefor Signed and Sealed this  
Eighteenth Day of November, 2014

Michelle K. Lee  
*Deputy Director of the United States Patent and Trademark Office*